(12) United States Patent
Hsiang

(10) Patent No.: US 10,911,757 B2
(45) Date of Patent: Feb. 2, 2021

(54) METHODS AND APPARATUSES OF PROCESSING PICTURES IN AN IMAGE OR VIDEO CODING SYSTEM

(71) Applicant: MEDIATEK INC., Hsinchu (TW)

(72) Inventor: Shih-Ta Hsiang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/642,455

(22) PCT Filed: Aug. 30, 2018

(86) PCT No.: PCT/CN2018/103213
§ 371 (c)(1),
(2) Date: Feb. 27, 2020

(87) PCT Pub. No.: WO2019/047763
PCT Pub. Date: Mar. 14, 2019

(65) Prior Publication Data
US 2020/0195924 A1 Jun. 18, 2020

Related U.S. Application Data

(60) Provisional application No. 62/657,102, filed on Apr. 13, 2018, provisional application No. 62/555,687, filed on Sep. 8, 2017.

(51) Int. Cl.
*H04N 19/119* (2014.01)
*H04N 19/167* (2014.01)
(Continued)

(52) U.S. Cl.
CPC ......... *H04N 19/119* (2014.11); *H04N 19/167* (2014.11); *H04N 19/176* (2014.11); *H04N 19/61* (2014.11); *H04N 19/96* (2014.11)

(58) Field of Classification Search
CPC ...... H04N 19/176; H04N 19/70; H04N 19/61; H04N 19/119; H04N 19/96; H04N 19/46;
(Continued)

(56) References Cited

U.S. PATENT DOCUMENTS 9,667,996 B2    5/2017  Chen et al.
2013/0287309 A1  10/2013  Sato
(Continued)

FOREIGN PATENT DOCUMENTS

CN    103957415 A    7/2014
CN    105580365 A    5/2016
(Continued)

OTHER PUBLICATIONS

International Search Report and Written Opinion dated Nov. 28, 2018, issued in application No. PCT/CN2018/103213.
(Continued)

*Primary Examiner* — Farhan Mahmud
(74) *Attorney, Agent, or Firm* — McClure, Qualey & Rodack, LLP

(57) ABSTRACT

Picture processing methods and apparatuses in an image or video encoding or decoding system for processing a picture partitioned into multiple non-overlapped Coding Tree Units (CTUs). Input data of a current CTU is received and split into one or more CUs. A CU entirely inside picture boundaries is split by a splitting type selected from a first set of splitting types, and a CU not entirely inside the picture boundaries is split by a splitting type selected from a second set of splitting types. The second set of splitting type comprises at least two different splitting types to provide flexibility for each out-of-bounds CU to select a splitting type. The current CTU is encoded or decoded when it is partitioned into leaf CUs for prediction and transform processing.

23 Claims, 12 Drawing Sheets

(51) Int. Cl.
*H04N 19/176* (2014.01)
*H04N 19/61* (2014.01)
*H04N 19/96* (2014.01)

(58) Field of Classification Search
CPC .... H04N 19/105; H04N 19/44; H04N 19/159; H04N 19/30; H04N 19/136; H04N 19/50; H04N 19/60; H04N 19/174; H04N 19/436; H04N 19/196
See application file for complete search history.

(56) References Cited

U.S. PATENT DOCUMENTS

| | | | |
|---|---|---|---|
| 2016/0065959 A1* | 3/2016 | Stobaugh | H04N 19/14 375/240.26 |
| 2016/0227244 A1* | 8/2016 | Rosewarne | H04N 19/463 |
| 2017/0347096 A1* | 11/2017 | Hong | H04N 19/70 |

FOREIGN PATENT DOCUMENTS

| | | |
|---|---|---|
| CN | 105637872 A | 6/2016 |
| EP | 3 396 955 A1 | 10/2018 |
| WO | 2016/209757 A1 | 12/2016 |
| WO | 2017/142262 A1 | 8/2017 |

OTHER PUBLICATIONS

Search Report dated Nov. 3, 2020, issued in application No. EP 18854353.2.

Li, X., et al.; "Multi-Type-Tree;" Joint Video Exploration Team (JVET) of ITU-T SG 16 WP 3 and ISO/IEC JTC 1/SC 29/WG 11; Oct. 2016; pp. 1-3.

Yang, F., et al.; "CTB splitting on frame boundary for arbitrary resolution video;" Joint Collaborative Team on Video coding (JCT-VC) of ITU-T SG16 WP3 and ISO/IEC JTC1/SC29/WG11; Oct. 2010; pp. 1-4.

* cited by examiner

MxM  M/2xM  MxM/2  M/2xM/2

M/4xM (L)  M/4xM (R)  MxM/4 (U)  MxM/4 (D)

METHODS AND APPARATUSES OF PROCESSING PICTURES IN AN IMAGE OR VIDEO CODING SYSTEM

CROSS REFERENCE TO RELATED APPLICATIONS

The present invention claims priority to U.S. Provisional Patent Application Ser. No. 62/555,687, filed on Sep. 8, 2017, entitled "Methods and apparatus for coding units of image and video data", and U.S. Provisional Patent Application Ser. No. 62/657,102, filed on Apr. 13, 2018, entitled "Methods and apparatus for coding units of image and video data". The U.S. Provisional Patent Applications are hereby incorporated by reference in their entireties.

TECHNICAL FIELD

The present invention relates to picture processing methods and apparatuses encode or decode pictures in an image or video coding system. In particular, the present invention relates to block partitioning methods for blocks not entirely inside picture boundaries.

BACKGROUND

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which splits each picture into multiple non-overlapped square Coding Tree Units (CTUs), also called Largest Coding Units (LCUs). Each individual CTU in a picture or a slice is processed in a raster scanning order. In the HEVC main profile, the maximum and the minimum sizes of a CTU are specified by syntax elements signaled in the Sequence Parameter Set (SPS). Each CTU is further recursively partitioned into one or more non-overlapped Coding Units (CUs) using quadtree (QT) splitting structure in order to adapt various local characteristics. The size of a CTU is selected from 64×64, 32×32, and 16×16 pixel samples. At each depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become parent node for another split into four child nodes with further reduced size by half in each spatial dimension. If a coding tree node is not further split, it is the leaf CU. The leaf CU size is restricted to be larger than or equal to a minimum allowed CU size, which is also specified in the SPS. An example of a recursive quadtree splitting structure is illustrated in FIG. 1, where the solid lines indicate CU boundaries in the CTU 100.

Once the CTUs are partitioned into leaf CUs, each leaf CU is subject to further split into one or more Prediction Units (PUs) according to a PU splitting type for prediction. FIG. 2 shows eight different PU splitting types defined in the HEVC standard. Each CU is split into one, two, or four PUs according to one of the eight PU splitting types shown in FIG. 2. Unlike the recursive quadtree splitting for CUs, each leaf CU may only be split once to form PUs. The PU works as a basic representative block for sharing prediction information as the same prediction process is applied to all pixels in the PU. The prediction information is conveyed to the decoder on a PU basis. After obtaining residual data generated by the prediction process based on the PU splitting type, the residual data belong to a leaf CU is partitioned into one or more Transform Units (TUs) according to another quadtree splitting structure for transforming the residual data into transform coefficients for compact data representation. The dashed lines in FIG. 1 indicate TU boundaries in the CTU 100. The TU is a basic representative block for applying transform and quantization on the residual data or transform coefficients. For each TU, a transform matrix having the same size as the TU is applied to the residual data to generate transform coefficients, and these transform coefficients are quantized and conveyed to the decoder on a TU basis.

The terms Coding Tree Block (CTB), Coding block (CB), Prediction Block (PB), and Transform Block (TB) are defined to specify two-dimensional (2-D) sample array of one color component associated with the CTU, CU, PU, and TU respectively. For example, a CTU consists of one luma CTB, two chroma CTBs, and its associated syntax elements. A similar relationship is valid for CU, PU, and TU. In the HEVC system, the same quadtree splitting structure is generally applied to both luma and chroma components unless a minimum size for the chroma block is reached.

Binary-tree (BT) splitting structure is an alternative structure to the quadtree splitting structure which recursively divides a block into two smaller blocks. FIG. 3 illustrates six exemplary splitting types for the binary-tree splitting structure, which includes symmetrical splitting types 31 and 32 and asymmetrical splitting types 33, 34, 35, and 36. A simplest binary-tree splitting structure only allows symmetrical horizontal splitting type 32 and symmetrical vertical splitting type 31. For a given block with size M×N, a first flag is signaled to indicate whether this block is partitioned into two smaller blocks, followed by a second flag indicating the splitting type if the first flag indicates splitting. This M×N block is split into two blocks of size M×N/2 if the splitting type is symmetrical horizontal splitting, and this M×N block is split into two blocks of size M/2×N if the splitting type is symmetrical vertical splitting. The splitting process can be iterated until the size, width, or height of a splitting block reaches a minimum allowed size, width, or height defined by a high level syntax in the video bitstream. Both the minimum allowed width and height need to be indicated since the binary-tree splitting structure is capable of splitting a block either horizontally or vertically. Horizontal splitting is implicitly not allowed if a block height is smaller than the minimum allowed height, and similarly, vertical splitting is implicitly not allowed if a block width is smaller than the minimum allowed width.

FIGS. 4A and 4B illustrate an example of block partitioning according to a binary-tree splitting structure and its corresponding coding tree structure. In FIG. 4B, one flag at each splitting node (i.e., non-leaf) of the binary-tree coding tree is used to indicate the splitting type, flag value equals to 0 indicates horizontal symmetrical splitting while flag value equals to 1 indicates vertical symmetrical splitting. Binary-tree partitioning may be applied at any level of block partitioning during encoding or decoding, for example, binary-tree partitioning may be used to split a slice into CTUs, a CTU into CUs, a CU in PUs, or a CU into TUs. The partitioning process may be simplified by omitting splitting from CU to PU and from CU to TU, as the leaf nodes of a binary-tree splitting structure is the basic representative block for both prediction and transform coding.

Joint Video Expert Team (JVET) of ITU-T SG16 WP3 and ISO/IEC JTC1/SC29/WG11 are currently in the process of establishing the next-generation video coding standard. Some promising new coding tools have been adopted into Versatile Video Coding (VVC) Working Draft (WD) 1 for further investigation. A new splitting structure called QuadTree plus Binary Tree (QTBT) structure is adopted in VVC WD 1 to balance the coding efficiency and the coding complexity of the quadtree splitting structure and the binary-tree splitting structure. An exemplary QTBT structure is shown in FIG. 5A, where a CTU is firstly partitioned by a quadtree structure then a binary-tree splitting structure. The CUs can be recursively partitioned by quadtree splitting until the current CU size reaches a minimum allowed quadtree leaf node size. Each leaf quadtree block may be partitioned by a binary-tree structure if the leaf quadtree block size is not larger than a maximum allowed binary-tree root node size. The binary-tree splitting may be recursively applied until the current CU size, width, or height reaches a minimum allowed binary-tree leaf node size, width, or height or the binary-tree depth reaches a maximum allowed binary-tree depth. Only horizontal symmetrical splitting and vertical symmetrical splitting are the two allowed binary-tree splitting types in VVC WD 1. The resulting leaf CUs from QTBT splitting are employed for prediction and transform processing without any further partitioning.

FIG. 5A illustrates an example of block partitioning structure according to the QTBT splitting structure and FIG. 5B illustrates a corresponding coding tree diagram for the QTBT splitting structure shown in FIG. 5A. The solid lines in FIGS. 5A and 5B indicate quadtree splitting while the dashed lines indicate binary-tree splitting. Similar to FIG. 4B, in each splitting node (i.e., non-leaf) of the binary-tree structure, one flag indicates which splitting type is used, 0 indicates horizontal symmetrical splitting and 1 indicates vertical symmetrical splitting. For CTUs coded in I-type slices, the QTBT coding tree representation for chroma coding tree blocks (CTBs) may be different from the QTBT coding tree representation for a corresponding luma CTB. For CTUs coded in P-type and B-type slice, the same QTBT coding tree representation is applied to both chroma CTBs and luma CTB. In the QTBT splitting structure, the minimum allowed quadtree leaf node size, the maximum allowed binary-tree root node size, the minimum allowed binary-tree leaf node width and height, and the maximum allowed binary-tree depth and height are indicated in the high level syntax such as in the SPS.

Multi-Type-Tree (MTT) splitting structure extends the concept of the two-level tree structure in the QTBT splitting structure by allowing both binary-tree splitting and triple-tree splitting in the second level of the MTT splitting structure. The two levels of trees in MTT are called region tree (RT) and prediction tree (PT) respectively. The first level RT is always quadtree (QT) splitting, while the second level PT is either binary-tree (BT) splitting or triple-tree (TT) splitting. For example, a CTU is firstly partitioned by RT, which is QT splitting; and each RT leaf node may be further divided by PT, which is either BT or TT splitting. A block partitioned by PT may be further split with PT until a maximum PT depth is reached. A PT leaf node is the leaf Coding Unit (CU) for prediction and transform and will not be further split. FIG. 6 illustrates five splitting types used in MTT splitting structure, where the splitting types include QT splitting type 61, BT splitting types 62 and 63, and TT splitting types 64 and 65. The vertical center-side TT splitting type 64 and horizontal center-side TT splitting type 65 divide a block into three smaller blocks, all having reduced sizes in one spatial dimension while keeping the same size in the other spatial dimension. Some parameters signaled for MTT include a root node size of QT, CtuSize, a minimum allowed QT leaf node size, MinQTSize, a maximum allowed root node size for BT/TT splitting, MaxCTSize, a maximum allowed tree depth in BT/TT splitting, MaxCTDepth, and a minimum allowed leaf node size in BT/TT, MinCTSize.

FIG. 7 illustrates an example of tree-type signaling for block partitioning according to the MTT splitting structure. RT signaling may be similar to quadtree signaling in the QTBT splitting structure. For signaling a PT node, one additional bin is signaled to indicate whether it is binary-tree partitioning or triple-tree partitioning. For a block split by RT, a first bin is signaled to indicate whether there is another RT split, if the block is not further split by RT (i.e. the first bin is 0), a second bin is signaled to indicate whether there is a PT split. If the block is also not further split by PT (i.e. the second bin is 0), then this block is a leaf node. If the block is then split by PT (i.e. the second bin is 1), a third bin is sent to indicate horizontal or vertical partitioning followed by a fourth bin for distinguishing binary tree (BT) splitting or triple tree (TT) splitting.

SUMMARY

Methods and apparatuses of picture processing in an image or video coding system comprises receiving input data associated with a current Coding Tree Unit (CTU) in a current picture, splitting the current CTU into one or more non-overlapped Coding Units (CUs), determining whether each CU is entirely inside boundaries of the current picture, splitting the CUs entirely inside the picture boundaries into leaf CUs according to a recursive partitioning structure, and recursively splitting each CU not entirely inside the picture boundaries into leaf CUs by selecting a splitting type from a second set of splitting types. CUs entirely inside the picture boundaries are referred to as in-bounds CUs and CUs not entirely inside the picture boundaries are referred to as out-of-bounds CUs. When the current CTU contains at least an in-bounds CU and the in-bounds CU is determined to be further partitioned, a splitting type is selected from a first set of splitting types associated with the recursive partitioning structure. The in-bounds CU becomes a leaf CU if it is not further partitioned. When the current CTU contains at least an out-of-bounds CU, the out-of-bounds CU is recursively split by a splitting type selected from the second set of splitting types, where the second set of splitting types includes at least two different splitting types for splitting the out-of-bounds CUs. The current CTU is encoded or decoded by individually processing each leaf CU in the current CTU for prediction and transform processing.

In some embodiments, information indicating whether to further split each out-of-bounds CU is inferred without explicitly signaling in the video bitstream. Information indicating which splitting type is selected for splitting each out-of-bounds CU may be inferred without explicitly signaling. In one implementation, all out-of-bounds CUs are inferred to be further split and the splitting type for each out-of-bounds CU is selected based on boundary conditions and the size of the out-of-bounds CU.

Embodiments of the second set of splitting types for the out-of-bounds CUs include at least two one-dimensional (1-D) splitting types; for example, a horizontal splitting type is selected for splitting an out-of-bounds CU crosses a bottom boundary of the current picture, and a vertical splitting type is selected for splitting an out-of-bounds CU crosses a right boundary of the current picture. The second set of splitting types may further include at least one two-dimensional (2-D) splitting type for splitting an out-ofbounds CU crosses both the bottom and right boundaries. Some examples of the 1-D splitting types are binary-tree horizontal symmetrical splitting, binary-tree vertical symmetrical splitting, horizontal center-side triple-tree splitting, and vertical center-side triple-tree splitting, and an example of the 2-D splitting type is quadtree splitting. The 1-D splitting type may be disabled for an out-of-bounds CU when a spatial dimension of the out-of-bounds CU is greater than a first threshold, and the 2-D splitting type may be disabled for an out-of-bounds CU when a spatial dimension of the out-of-bounds CU is less than a second threshold. In an embodiment where the second set of splitting types includes quadtree splitting and binary-tree splitting, the second threshold is derived by two times the first threshold. When the recursive partitioning structure is a QTBT splitting structure or a MTT splitting structure, the first threshold may be set equal to or derived from a maximum allowed binary-tree or triple-tree root node size, and the second threshold may be set equal to or derived from a minimum allowed quadtree leaf node size. In one embodiment, the 2-D splitting type is disabled for splitting an out-of-bounds CU when a spatial dimension of the out-of-bounds CU is less than a second threshold and the out-of bounds CU is not located at a bottom-right corner of the current picture. In another embodiment, the 2-D splitting type is disabled for splitting an out-of-bounds CU divided form a parent CU using a 1-D splitting type. A flag may be signaled to indicate the selected splitting type for an out-of-bounds CU when the out-of-bounds CU crosses only one picture boundary and both the 1-D and 2-D splitting types are enabled. The flag may specifically denote the splitting type or the flag may only indicates the out-of-bounds CU is partitioned by the 1-D splitting type or 2-D splitting type as the splitting direction is inferred according to boundary conditions of the out-of-bounds CU when the 1-D splitting type is selected.

In a specific embodiment, the second set of splitting types comprises quadtree splitting, binary-tree horizontal symmetrical splitting, and binary-tree vertical symmetrical splitting when the recursive partitioning structure is a QTBT structure or a MTT structure. An out-of-bounds CU in this embodiment cannot be partitioned using triple-tree splitting so it is inferred to be partitioned using binary-tree symmetrical splitting if the out-of-bounds CU is split by a 1-D splitting type.

A variation of the picture processing method splits an in-bounds CU by a 2-D splitting type but splits an out-of-bounds CU by a 1-D splitting type. The in-bounds CUs are partitioned into leaf CUs according to a recursive partitioning structure such as QTBT or MTT, and each out-of-bounds CU is recursively split until all child CUs split from the parent out-of-bounds CU are in-bounds CUs. Information regarding whether to further split the out-of-bounds CU may be inferred without explicitly signaling and information regarding a splitting direction of the 1-D splitting type may also be inferred without explicitly signaling in the video bitstream. When the splitting direction is inferred, the out-of-bounds CU is split by horizontal splitting if it crosses a bottom picture boundary and is split by vertical splitting if it crosses a right picture boundary. The 1-D splitting type for splitting the out-of-bounds CUs may be binary-tree splitting, triple-tree splitting, or both.

Aspects of the disclosure further provide an apparatus for the image or video coding system which splits the out-of-bounds CUs by a splitting type selected from a set of splitting types including at least two different splitting types. The apparatus partitions the out-of-bounds CUs by 1-D splitting types to allow more flexible block partitioning around the picture boundaries hence enhancing the coding efficiency. Embodiments of the apparatus receive input data of a current CTU in a current picture, split each in-bounds CU in the current CTU into leaf CUs according to a recursive partitioning structure, and split each out-of-bounds CU in the current CTU by a splitting type selected according to boundary conditions and size of the out-of-bounds CU. The apparatus encodes or decodes the current CTU by individually processing each leaf CU in the current CTU in prediction and transform processing.

Aspects of the disclosure further provide a non-transitory computer readable medium storing program instructions for causing a processing circuit of an apparatus to perform image or video coding process to encode or decode a current CTU which allows more flexible partitioning for blocks not entirely inside picture boundaries. Other aspects and features of the invention will become apparent to those with ordinary skill in the art upon review of the following descriptions of specific embodiments.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
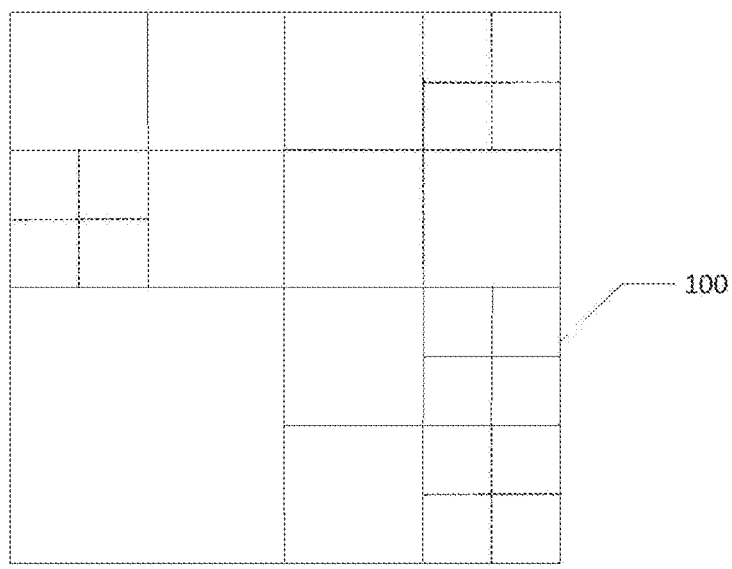
FIG. 1 illustrates an exemplary coding tree for splitting a Coding Tree Unit (CTU) into Coding Units (CUs) and splitting each CU into one or more Transform Units (TUs) according to the quadtree splitting structure.
Figure 2:
FIG. 2 illustrates eight different PU splitting types for partitioning a CU into one or more PUs defined in the HEVC standard.
Figure 2:
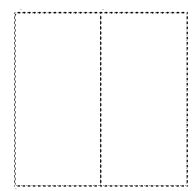
Figure 2:
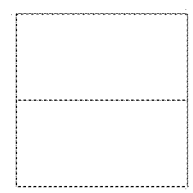
Figure 2:
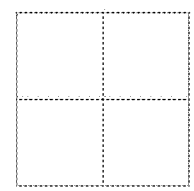
Figure 2:
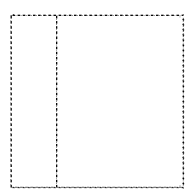
Figure 2:
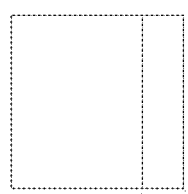
Figure 2:
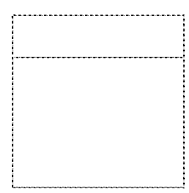
Figure 2:
Figure 3:
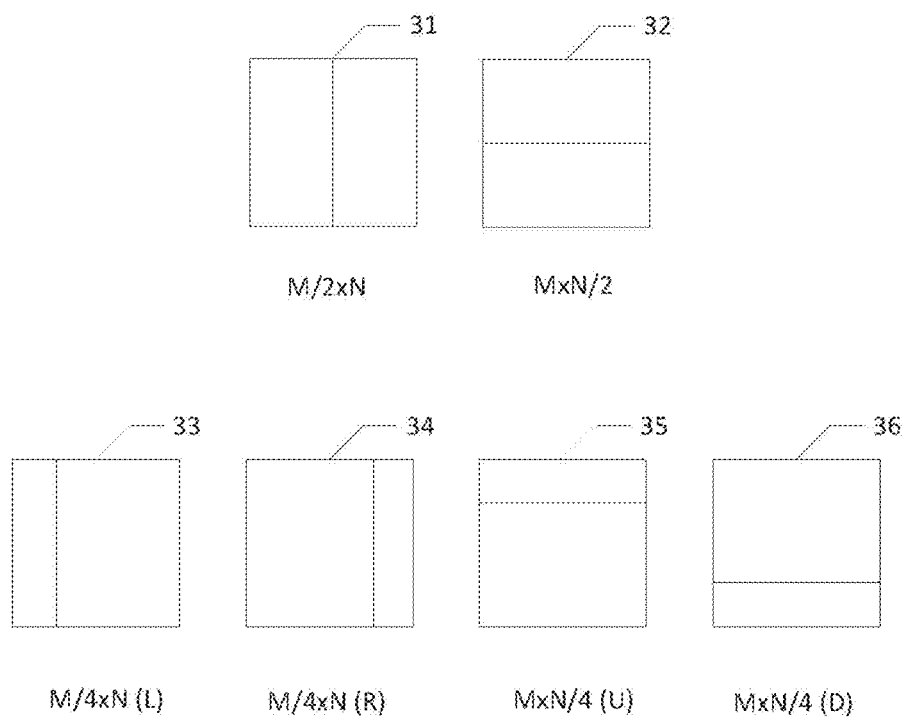
FIG. 3 illustrates six exemplary splitting types of a binary-tree splitting structure.
Figure 4A:
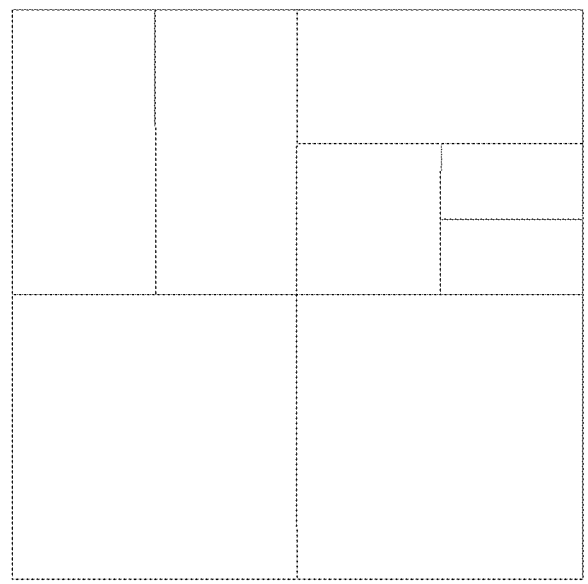
FIG. 4A illustrates an exemplary block partitioning structure according to a binary-tree splitting structure.
Figure 4B:
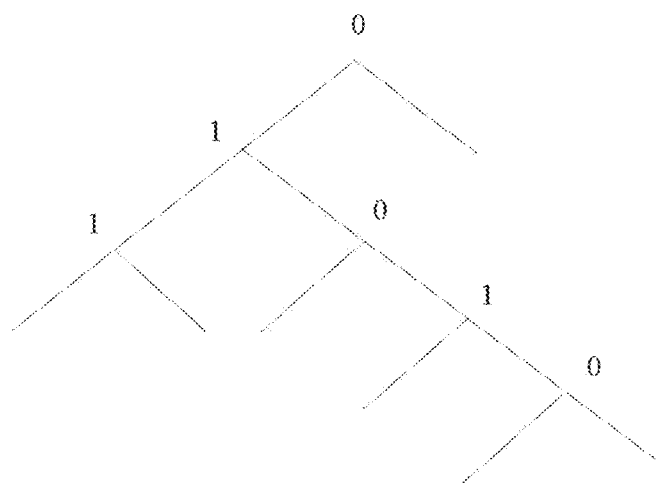
FIG. 4B illustrates a coding tree structure corresponding to the binary-tree splitting structure shown in FIG. 4A.
Figure 5A:
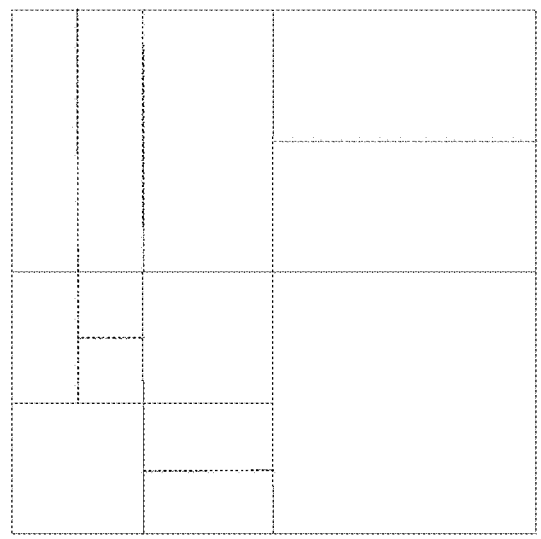
FIG. 5A illustrates an exemplary block partitioning structure according to a QuadTree plus Binary Tree (QTBT) splitting structure.
Figure 5B:
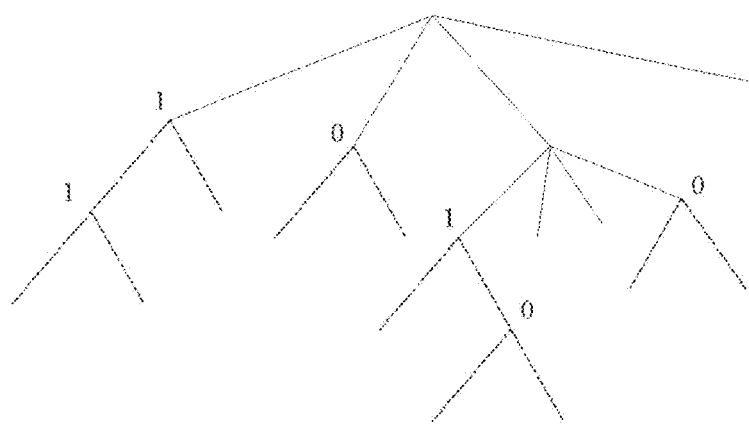
FIG. 5B illustrates a coding tree structure corresponding to the QTBT splitting structure of FIG. 5A.
Figure 6:
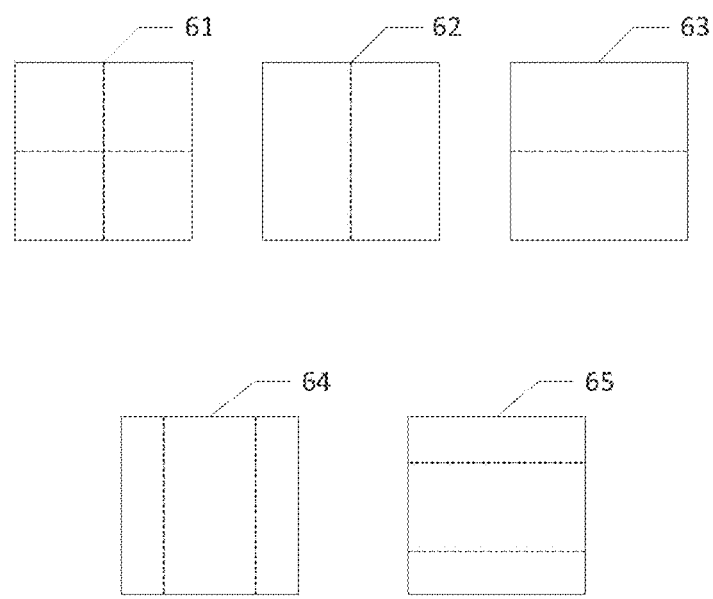
FIG. 6 illustrates five splitting types used in an exemplary Multi-Type Tree (MTT) splitting structure.
Figure 7:
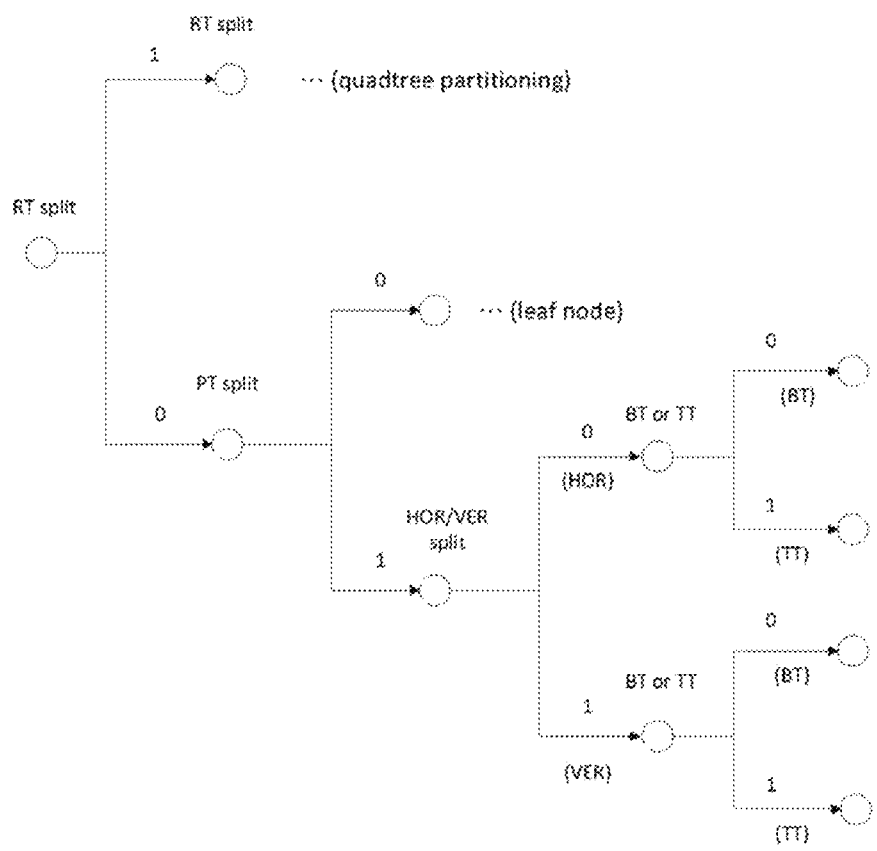
FIG. 7 illustrates an example of tree-type signaling for block partitioning according to the MTT splitting structure.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Embodiments of the present invention relate to block partitioning along picture boundaries for achieving better image or video coding efficiency. A picture to be encoded or decoded is divided into non-overlapping CTUs and each CTU may be further divided into multiple non-overlapping leaf CUs using a recursive partitioning structure. The recursive partitioning structure in the HEVC standard divides each CTU by recursive quadtree splitting, and the recursive partitioning structure in VVC WD 1 divides each CTU by recursive quadtree splitting followed by recursive binary-tree splitting. For each block split from a CTU in a current picture with a block region entirely inside boundaries of the current picture, an encoder or a decoder decides whether to further split the block into smaller blocks. For a block split from a CTU in a current picture with a block region not entirely inside the boundaries of the current picture, the block is forced to be further divided by quadtree splitting according to the text specification of the HEVC standard and the implementations for VVC WD 1. The block having a block region entirely inside the picture boundaries is called an in-bounds CU in this disclosure, whereas the block having a block region not entirely inside the picture boundaries is called out-of-bounds CU in this disclosure. Quadtree splitting of an out-of-bounds CU results in four child nodes; if a block region of a child node is entirely outside the current picture boundaries, this child node is not further processed; if a block region of a child node is entirely inside the current picture boundaries, this child node becomes an in-bounds CU which can be either the leaf CU or further split into smaller blocks; and if a block region of a child node is still not entirely inside the current picture boundaries, this child node is an out-of-bounds CU, and is forced to be further divided by quadtree splitting. The syntax information indicating whether to partition the out-of-bounds CUs is not signaled since the out-of-bounds CUs are always divided by quadtree splitting. Each out-of-bounds CU in the current picture is forced to be recursively divided into four smaller CUs until every CU is either entirely inside or entirely outside the current picture. For a picture with at least one spatial dimension not divisible by a length or width of a CTU, the picture boundary region is forced to be partitioned into many small square CUs by quadtree splitting according to the HEVC standard and the implementations in VVC WD 1. To compress a region with low-motion content or smooth texture, an increasing number of small CUs in a picture typically reduces the frame coding efficiency and requires more computational time.

Figure 8A:
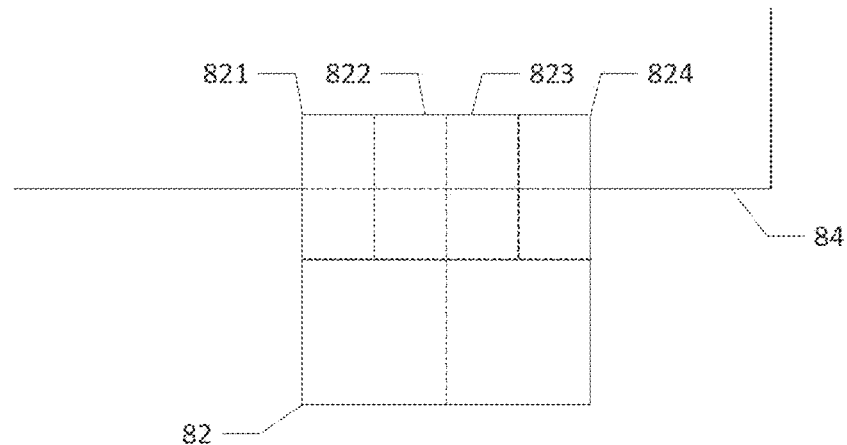
FIG. 8A illustrates an example of partitioning an out-of-bounds CU across a bottom picture boundary by two stages of quadtree splitting according to the HEVC standard.
Figure 8B:
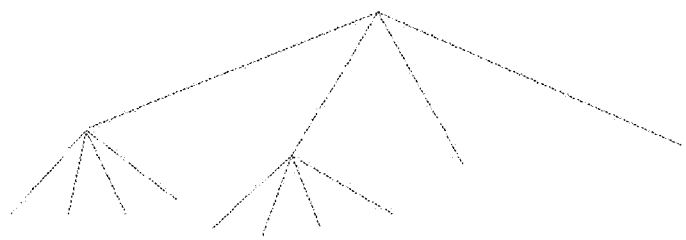
FIG. 8B illustrates a corresponding coding tree representation of block partitioning in the out-of-bounds CU shown in FIG. 8A.

FIG. 8A illustrates an exemplary partitioning structure of an out-of-bounds CU along the bottom picture boundary according to the partitioning algorithm adopted in HEVC and VVC WD 1. FIG. 8B illustrates a corresponding coding tree representation for the partitioning structure shown in FIG. 8A. The coding tree representation in FIG. 8B demonstrates two stages of quadtree splitting, where only the two top blocks split from the first stage quadtree splitting are further divided by the second stage quadtree splitting. In FIG. 8A, a root out-of-bounds CU 82 has a top quarter region inside a current picture while the remaining region of the root out-of-bounds CU 82 is outside the current picture. The boundaries of the current picture are illustrated by a dotted line 84 and resulting partitioning for the root out-of-bounds CU 82 is illustrated by dashed lines inside the root out-of-bounds CU 82. The root out-of-bounds CU 82 is split by two stages of quadtree splitting in order to have all the resulting child CUs 821, 822, 823, and 824 entirely inside the current picture.

Embodiments of the present invention permit splitting an out-of-bounds CU with a splitting type selected from at least two different splitting types as opposed to always using quadtree splitting to partition the out-of-bound CU. The splitting type for splitting an out-of-bounds CU at a current coding tree node may be selected by considering contextual information such as boundary conditions, position of the out-of-bounds CU, and spatial dimensions of the out-of-bounds CU. In particular, some one-dimensional (1-D) splitting types are better options for splitting the out-of-bounds CUs into smaller blocks with reduced size in only one spatial dimension while keeping the same size in the other spatial dimension, some examples of the 1-D splitting types include symmetrical and asymmetrical binary-tree splitting types and triple-tree splitting types.

Figure 9A:
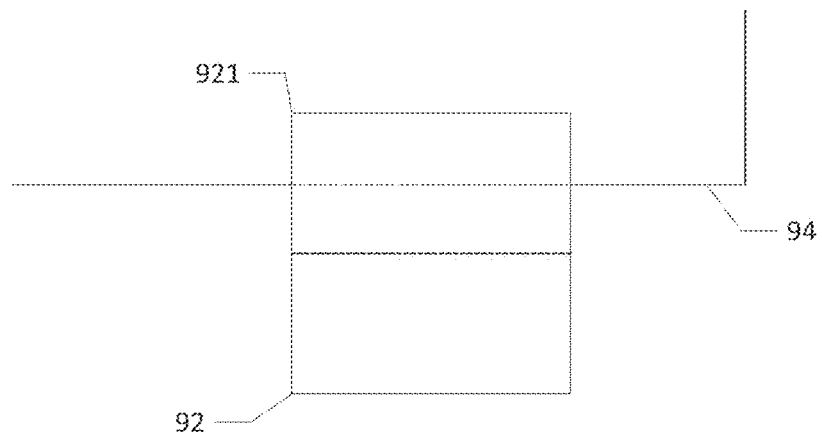
FIG. 9A illustrates an example of partitioning an out-of-bounds CU across a bottom picture boundary by two stages of binary-tree horizontal symmetrical splitting according to an embodiment of the present invention.
Figure 9B:
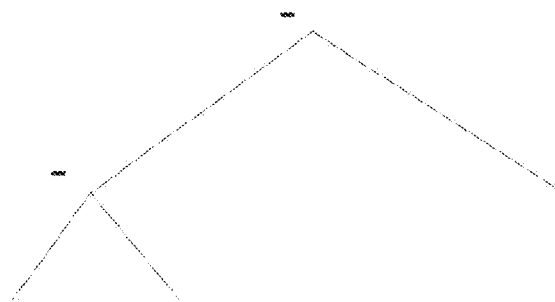
FIG. 9B illustrates a corresponding coding tree representation of block partitioning in the out-of-bounds CU shown in FIG. 9A.

FIG. 9A illustrates an exemplary partitioning structure of an out-of-bounds CU along a bottom picture boundary according to an embodiment of the present invention. A root out-of-bounds CU 92 is similar to the root out-of-bounds CU 82 in FIG. 8A, where only a top quarter region of the root out-of-bounds CU 92 is inside the current picture. The boundaries of the current picture are illustrated by a dotted line 94 and resulting partitioning for the root out-of-bounds CU 92 is illustrated by dashed lines inside the root out-of-bounds CU 92. Instead of dividing the top quarter region into four small square blocks 821, 822, 823, and 824 after the two stages of quadtree splitting as shown in FIG. 8A, the top quarter region contains only one rectangular partition 921 after two stages of binary-tree horizontal symmetrical splitting as shown in FIG. 9A. FIG. 9B illustrates a corresponding coding tree representation for the partitioning structure of two stages of horizontal splitting (-) shown in FIG. 9A, which is much simpler than the coding tree representation shown in FIG. 8B.

Splitting Type Selection for Out-of-Bounds CUs

An encoder or decoder processes CTUs of a picture or a slice in a raster scanning order. A CU partitioning module in the encoder or decoder determines a partitioning structure of each CTU and divides each CTU into one or more non-overlapped leaf CUs according to a recursive partitioning structure, each leaf CU in the CTU is then individually processed by prediction as well as transform or inverse transform. In the process of partitioning a current CTU in a current picture, embodiments of the present invention determine if the current CTU contains any out-of-bounds CU, and determine whether a current block in the current CTU is an in-bounds CU or an out-of-bounds CU by checking if the current block is entirely inside boundaries of the current picture. In-bounds CUs in the current CTU are split into leaf CUs according to the recursive partitioning structure such quadtree splitting, QTBT, or MTT. An out-of-bounds CU in the current CTU is split by a splitting type selected from two or more splitting types according to some embodiments. In one example, a current CTU is located in the last CTU row of the current picture and only has a top portion inside the picture boundaries, and the CU partitioning module selects a splitting type from at least one 1-D splitting type and a 2-D splitting type to divide the current CTU into child CUs. In another example, the same current CTU is forced to be split by a predefined splitting type such as the 2-D splitting type until the child CUs are smaller than a threshold or until a predefined partitioning depth.

Each child CU in the current CTU may be further partitioned into smaller child CUs by one or more stages of splitting, and before each stage of splitting, each CU is classified as an in-bounds CU or an out-of-bounds CU. For an in-bounds CU, the CU partitioning module in the encoder decides whether to further split the in-bounds CU and determines a splitting type from a first set of splitting types if it is further split. The first set of splitting types corresponds to the recursive partitioning structure such as quadtree splitting, QTBT, or MTT. The splitting decision may be determined by the encoder according to an encoding algorithm such as Rate-Distortion-Optimization (RDO), and the decoder determines the same splitting decision by parsing corresponding syntax information in the video bitstream. For example, the first set of splitting types includes quadtree splitting, binary-tree horizontal symmetrical splitting, and binary-tree vertical symmetrical splitting when the recursive partitioning structure is QTBT. In another example, the first set of splitting types includes quadtree splitting, binary-tree horizontal symmetrical splitting, binary-tree vertical symmetrical splitting, horizontal center-side triple-tree splitting, and vertical center-side triple-tree splitting when the recursive partitioning structure is MTT.

Out-of-bounds CUs are not always split by the same splitting type, embodiments of the CU partitioning module splits each out-of-bounds CU into multiple child CUs by a splitting type selected from a second set of splitting types containing at least two different splitting types. For example, the second set of splitting types includes two 1-D splitting types, or at least a 1-D splitting type and a 2-D splitting type. Examples of a 1-D splitting type include binary-tree horizontal symmetrical splitting, binary-tree vertical symmetrical splitting, binary-tree horizontal asymmetrical splitting, binary-tree vertical asymmetrical splitting, horizontal center-side triple-tree splitting, and vertical center-side triple-tree splitting.

Inferred Information for Splitting Type Selection

The encoder may skip signaling information indicating whether to further split each out-of-bounds CU as all out-of-bounds CUs are inferred to be further split without explicitly signaling in some embodiments. Similarly, the encoder may skip signaling information indicating the splitting direction or splitting type for each out-of-bounds CU as the splitting direction or splitting type is inferred without explicitly signaling in the video bitstream. In an embodiment of skip signaling the splitting direction, when a flag indicates an out-of-bounds CU is split using a 1-D splitting type, the splitting direction for the out-of-bounds CU is inferred to be horizontal direction if it is across the bottom picture boundary and inferred to be vertical direction if it is across the right picture boundary.

In an embodiment of skip signaling the splitting type, when a current out-of-bounds CU crosses a right boundary of the current picture, an encoder or a decoder implicitly selects a predefined vertical splitting type such as binary-tree vertical symmetrical splitting or vertical center-side triple-tree splitting to divide the current out-of-bounds CU into multiple child CUs. Each child CU will have the same CU height as its parent CU but with a reduced CU width. When the current out-of-bounds CU crosses a bottom boundary of the current picture, the encoder or decoder implicitly selects a predefined horizontal splitting type such as binary-tree horizontal symmetrical splitting or horizontal center-side triple-tree splitting to divide the current out-of-bounds CU into multiple child CUs. Each child CU will have the same CU width as its parent CU but a reduced CU height. In a case when the current out-of-bounds CU crosses both the right and bottom boundaries of the current picture, the encoder or decoder implicitly selects a predefined 2-D splitting type such as quadtree splitting to divide the current out-of-bounds CU into multiple child CUs, each having reduced CU size in both spatial dimensions.

In another embodiment of skip signaling the splitting type for partitioning out-of-bound CUs, the splitting type for a current out-of-bounds CU is inferred according to the current out-of-bounds CU size. For example, quadtree splitting is always selected as the splitting type for out-of-bounds CUs with a spatial dimension of the CU size greater than a threshold in order to efficiently divide these large out-of-bounds CUs into four smaller child CUs. In another example, a 1-D splitting type is always selected as the splitting type for out-of-bounds CUs with a spatial dimension of the CU size less than a threshold so the out-of-bounds CU is divided into smaller child CUs each with a reduced size in only one spatial dimension.

In an embodiment of employing the QTBT structure as specified in VVC WD 1, quadtree splitting is always selected as the predefined and inferred splitting type when a current out-of-bounds CU crosses both right and bottom picture boundaries or when the current out-of-bounds CU has a size greater than a maximum binary-tree boundary CU size, referred to as max_BT_bdy_CU_size. The inferred splitting type is binary-tree splitting in a horizontal direction when the current out-of-bounds CU is across the bottom picture boundary and the inferred splitting type is binary-tree splitting in vertical direction when the current out-of-bounds CU is across the right picture boundary.

Re-Using Splitting Types

An aspect of implementing the partitioning methods for out-of-bounds CUs relates to re-using all or a portion of splitting types available for splitting regular in-bounds CUs for splitting the out-of-bounds CUs. A CU partitioning module in the video encoder or decoder may efficiently re-use existing system modules and syntax sets for coding the out-of-bounds CUs. In some embodiments of re-using all the splitting types, regular in-bounds CUs are partitioned according to the QTBT splitting structure as specified in VVC WD 1, and each of the out-of-bounds CUs is also partitioned using one of quadtree splitting, binary-tree horizontal symmetrical splitting, and binary-tree vertical symmetrical splitting. In an embodiment, partitioning of out-of-bounds CUs follows the same rule as the QTBT splitting structure, that is, binary-tree splitting is selected after quadtree splitting so quadtree splitting is not allowed after binary-tree splitting. For example, an out-of-bounds CU cannot select quadtree splitting if it is partitioned by binary-tree splitting from a parent out-of-bounds CU. The QTBT splitting structure also defines a minimum size for quadtree splitting and a maximum size for binary-tree splitting, an embodiment of re-using these restriction disabling quadtree splitting for an out-of-bounds CU if the size of the out-of-bounds CU is less than a minimum allowed quadtree leaf node size, and disabling binary-tree splitting for an out-of-bounds CU if the size of the out-of-bounds CU is greater than a maximum allowed binary-tree root node size.

Predefined Subset of Splitting Types

In a case of employing the MTT structure to divide regular in-bounds CUs, all the splitting types available in the MTT structure may be reused to split out-of-bounds CUs, that is each out-of-bounds CU is partitioned by one of quadtree splitting, binary-tree horizontal symmetrical splitting, binary-tree vertical symmetrical splitting, horizontal center-side triple-tree splitting, and vertical center-side triple-tree splitting. Since there are multiple 1-D splitting types for each spatial direction, an embodiment limits the selection of the 1-D splitting types for dividing the out-of-bounds CUs by allowing only a predefined subset of the 1-D splitting types in each spatial direction for splitting the out-of-bounds CUs. For example, although quadtree splitting, binary-tree splitting, and triple-tree splitting are used in the MTT structure to partition regular in-bounds CUs, only quadtree splitting and binary-tree splitting are used to partition out-of-bounds CUs. In this way, when an out-of-bounds CU is determined to be split by a 1-D splitting type and a corresponding splitting direction is derived or signaled, the video encoder or video decoder selects the splitting type without further signaling it is binary-tree splitting or triple-tree splitting. The predefined subset of the 1-D splitting types for dividing a current out-of-bounds CU may be adjusted according to boundary conditions of the current out-of-bounds CU. For example, when the MTT structure is employed for partitioning regular in-bounds CUs, a video encoder or video decoder always selects triple-tree splitting for a current out-of-bounds CU if the current out-of-bounds CU crosses only one side of the picture boundaries and less than half of the CU block region is inside the picture boundaries. Under such boundary conditions, triple-tree splitting is more efficient since one stage of triple-tree splitting and two stages of recursive binary-tree splitting of the same direction lead to the same CU partitions inside the picture boundaries. The video encoder or video decoder therefore skips explicitly signaling the selected 1-D splitting type for the current out-of-bounds CU as triple-tree splitting is the inferred 1-D splitting type when less than half of the CU block region is inside the picture boundaries; and binary-tree splitting is the inferred 1-D splitting type when half or more than half of the CU block region is inside the picture boundaries.

Constraints on Selection of Splitting Type

Certain constraints on the selection of splitting types for regular in-bounds CUs may be applied to the out-of-bounds CUs to reduce implementation costs for encoders and decoders. For example, the QTBT structure first partitions a CTU by recursive quadtree splitting then binary-tree splitting is performed sequentially following the quadtree leaf node. To control the complexity of the QTBT structure, some parameters restricts the depth of quadtree splitting and binary-tree splitting, and some parameters limits the allowable block sizes for quadtree leaf node and binary-tree root node. A minimum allowed quadtree leaf node size implies quadtree splitting must be terminated if the block size reaches this specific size. A maximum allowed binary-tree root node size implies binary-tree splitting may begin to split if the block size is smaller than or equal to this specific size. A maximum quadtree depth defines the maximum number of stages of recursive quadtree splitting from the CTU. These parameters may also be applied to partition an out-of-bounds CU. An out-of-bounds CU with a size greater than the maximum allowed binary-tree root node size will always be split using quadtree splitting. An out-of-bounds CU with a size equal to or less than the minimum allowed quadtree leaf node size or having the quadtree depth greater than or equals to the maximum quadtree depth will always be split using binary-tree splitting. Some exceptions may be applied in some embodiments, for example, the CU partitioning module still allows an out-of-bounds CU to be recursively partitioned by a 1-D splitting type disregarding the constraint on the maximum 1-D tree depth, and allows a bottom-right out-of-bounds CU to be recursively partitioned by quadtree splitting disregarding the constraint on the maximum quadtree depth.

An embodiment of the present invention sets different constraint parameter values for dividing in-bounds CUs that are partitioned from out-of-bounds CUs. For example, a maximum allowed binary-tree depth for dividing in-bounds CUs split from an out-of-bounds CTU is set to be larger than a maximum allowed binary-tree depth for dividing in-bounds CUs split from an in-bounds CTU in a QTBT or MTT splitting structure, which allows dividing the in-bounds CUs split from an out-of-bounds CTU through more stages of binary-tree splitting. In another embodiment, the same constraint parameter values are set for in-bounds CUs split from an in-bounds CTU or from an out-of-bounds CTU, for example, the maximum allowed binary-tree depth is the same for all the in-bounds CUs regardless its root CU corresponds to an in-bounds CTU or an out-of-bounds CTU.

Explicitly Signaling Selected Splitting Type

In some embodiments of the present invention, the selected splitting type for dividing an out-of-bounds CU is explicitly signaled with related splitting parameters derived from the current coding context. An exemplary video encoder explicitly signals a flag to indicate whether quadtree splitting or binary-tree splitting is selected for dividing a current out-of-bounds CU when a QTBT structure specified for VVC WD 1 is employed for dividing CTUs into multiple leaf CUs, and a corresponding video decoder determines the current out-of-bounds CU is split by quadtree splitting or binary-tree splitting based on the signaled flag. The corresponding splitting direction may be explicitly signaled or inferred when binary-tree splitting is selected as the splitting type, if the splitting direction is inferred, horizontal splitting is selected when a current out-of-bounds CU crosses the bottom picture boundary and vertical splitting is selected when the current out-of-bounds CU crosses the right picture boundary. In another embodiment, a flag is first signaled to indicate whether the splitting type for a current out-of-bounds CU is a 1-D splitting type or a 2-D splitting type, and if the 1-D splitting type is selected, another flag is signaled to indicate whether the 1-D splitting type is binary-tree splitting or triple-tree splitting. The splitting direction in this embodiment may also be signaled or inferred when the 1-D splitting type is selected for the current out-of-bounds CU.

Splitting Type Selection Example

In an example of determining a splitting type for a current out-of-bounds CU, let picWidth and picHeight respectively denote the width and height of a current picture consisting of a plurality of CTUs, and the CTUs are to be partitioned into leaf CUs by the QTBT splitting structure. The coordinate (x,y) denotes a top-left sample location, cuWidth and cuHeight respectively represents the width and height of the current out-of-bounds CU, and the current out-of-bounds CU is across one or both picture boundaries as ((x+cuWidth)>picWidth||(y+cuHeight)>picHeight is satisfied. The selected splitting type for the current out-of-bounds CU may be derived implicitly by examining one or more criteria such as the boundary condition, size, and splitting depth, or the splitting type is explicitly signaled. In this example, when binary-tree splitting is disabled or the condition ((x+cuWidth)>picWidth && (y+cuHeight)>picHeight) is satisfied for the current out-of-bounds CU, the splitting type is inferred as quadtree splitting. Binary-tree splitting may be disabled for the current out-of-bounds CU when cuWidth is greater than a predefined maximum binary-tree boundary CU size max_BT_bdy_CU_size. Binary-tree splitting is inferred as the selected splitting type when quadtree splitting is disabled for the current out-of-bounds CU, and quadtree splitting is disabled when the binary-tree depth of the current out-of-bounds CU is greater than 0 or the width of the current out-of-bounds CU cuWidth is less than or equal to a predefined minimum quadtree boundary CU size min_QT_bdy_CU_size. If none of the criteria is met, a flag indicating whether the current out-of-bounds CU is partitioned by quadtree splitting or binary-tree splitting is signaled. When the current out-of-bounds CU is inferred or signaled to be split by binary-tree splitting, the splitting direction is inferred to be horizontal if (y+cuHeight) is greater than picHeight, otherwise the splitting direction is inferred to be vertical.

Constrains on Splitting Type to Avoid Redundant Coding Tree Representation

The QTBT splitting structure allows different coding tree representations correspond to same partitioning. An aspect of the present invention further imposes some constraints on syntax values corresponding to splitting type selection for out-of-bounds CUs in order to remove a redundant coding tree representation. An embodiment of setting an constrain for the splitting type restricts partitioning an out-of-bounds CU by binary-tree horizontal symmetrical splitting immediately followed by binary-tree vertical symmetrical splitting, or partitioning an out-of-bounds CU by binary-tree vertical symmetrical splitting immediately followed by binary-tree horizontal symmetrical splitting. For example, a current out-of-bounds CU has a top half and a bottom half respectively inside and outside the bottom picture boundary, partitioning the current out-of-bounds CU by quadtree splitting and partitioning the current out-of-bounds CU by binary-tree horizontal splitting followed by binary-tree vertical splitting lead to the same partitions inside the picture boundaries. When quadtree splitting is enabled and the splitting type for the current out-of-bounds CU is selected as binary-tree horizontal splitting, the current out-of-bounds CU is split into a top child CU entirely inside the picture boundaries. If the top child CU is further split, the video encoder or decoder restricts the splitting direction for splitting the top child CU in order to remove a redundant coding tree representation. The splitting direction for splitting the top child CU has to be horizontal; therefore the splitting direction in this example may be inferred to be horizontal without explicitly signaling. In another example, a current out-of-bounds CU has a left half and a right half respectively inside and outside the right picture boundary. When quadtree splitting is enabled for splitting the current out-of-bounds CU and binary-tree vertical splitting is eventually selected as the splitting type, the current out-of-bounds CU is split into a left child CU entirely inside the picture boundaries. The video encoder or decoder only allows the splitting direction for the left child CU to be vertical in order to remove a redundant coding tree representation. The splitting direction for splitting the left child CU in this example may be inferred to be vertical without explicitly signaling.

Exemplary Flow Charts

Figure 10:
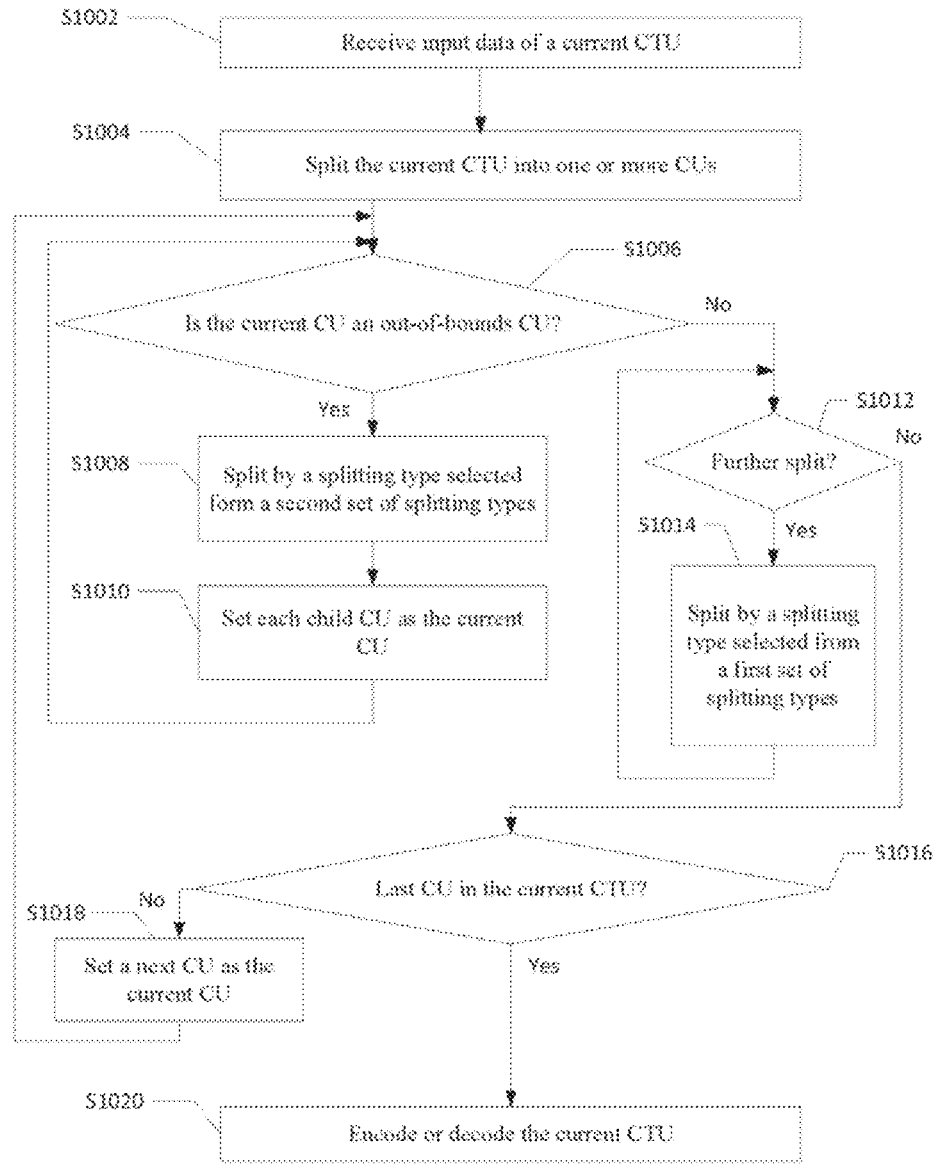
FIG. 10 is a flow chart illustrating an embodiment of the picture processing method for encoding or decoding a current CTU in a current picture.

FIG. 10 is a flow chart illustrating an exemplary embodiment of the picture processing method implemented in an image or video encoding or decoding system. A picture is first partitioned into multiple non-overlapped blocks, such as Coding Tree Units (CTUs), and each block is further partitioned into one or more non-overlapped leaf blocks, such as leaf Coding Units (CUs), by a recursive partitioning structure. Some examples of the recursive partitioning structure are the previously described QTBT and MTT splitting structures. The encoding or decoding system in this exemplary embodiment processes a current CTU in a current picture by first receiving input data associated with the current CTU in Step S1002. The input data associated with the current CTU includes a set of pixels at the encoding system, or the input data associated with the current CTU is a video bitstream corresponding to compressed data including the current CTU at the decoding system. The current CTU is partitioned into one or more CUs in Step S1004, and the encoding or decoding system determines whether a current CU is an in-bounds CU or an out-of-bounds CU in Step S1006. The in-bounds CU is a CU entirely inside boundaries of the current picture and the out-of-bounds CU is a CU not entirely inside the current picture boundaries. If the current CU is an in-bounds CU, the encoding or decoding system determines whether the current CU is further split into multiple child CUs in Step S1012, and the current CU is partitioned by a splitting type selected from a first set of splitting types in Step S1014 if the current CU is further split. The first set of splitting types corresponds to the splitting types allowed in the recursive partitioning structure. Each child CU split from the current CU is determined whether it is further split in Step S1012, and the child CU is split in Step S1014 if the result is affirmative. When the current CU is not further split in Step S1012, Step S1016 checks whether the current CU is a last CU in the current CTU. If the current CU is an out-of-bounds CU, the current CU is partitioned by a splitting type selected from a second set of splitting types in Step S1008. The second set of splitting types includes at least two different splitting types, an example of the second set includes two splitting types such as two 1-D splitting types, another example of the second set includes three splitting types such as two 1-D splitting types and one 2-D splitting type, and another example of the second set includes five splitting types such as four 1-D splitting types and one 2-D splitting type. Each child CU partitioned from the current out-of-bounds CU may be an in-bounds CU or an out-of-bounds CU, so each child CU is sequentially set as the current CU in Step S1010 and is checked whether it is an out-of-bounds CU in Step S1006. This partitioning process recursively splits the out-of-bounds CU until all child CUs are in-bounds CUs. When the current CU is not further split in Step S1012, the encoding or decoding system checks if this current CU is a last CU in the current CTU in step S1016. If the current CU is not the last CU in the current CTU, a next CU is set as the current CU in Step S1018 and the process goes to Step S1006. The current CTU is encoded or decoded in Step S1020 by individually processing each leaf CU for prediction and transform processing after partitioning the current CTU into multiple leaf CUs.

Figure 11:
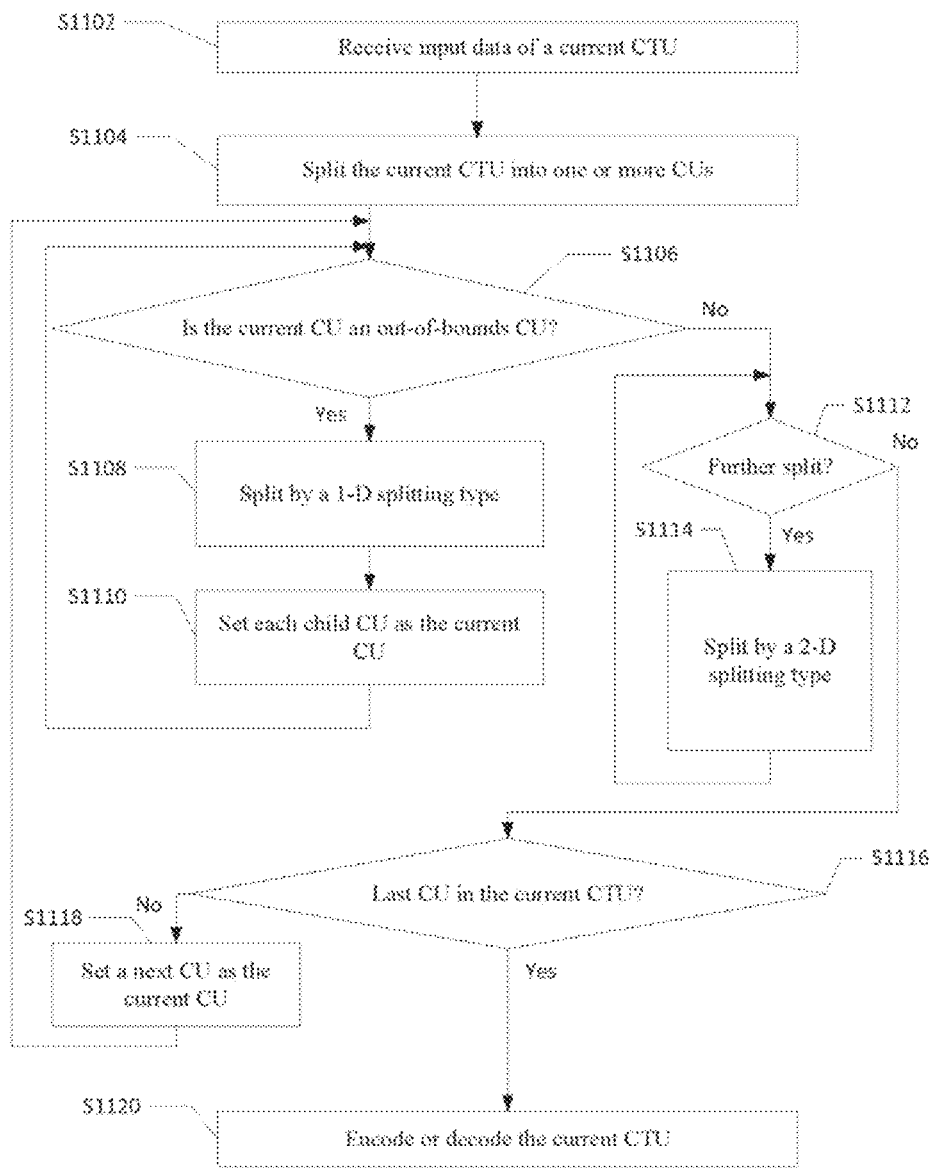
FIG. 11 is a flowchart illustrating another embodiment of picture processing method for encoding or decoding a current CTU in a current picture.

FIG. 11 is a flow chart illustrating another exemplary embodiment of the picture processing method that can be implemented in an image or video encoding or decoding system. The processing method shown in FIG. 11 is similar to the processing method in FIG. 10. The encoding or decoding system receives input data of a current CTU in Step S1102, and splits the current CTU into one or more CUs in Step S1104. The input data associated with the current CTU includes a set of pixels at the encoding system, or the input data associated with the current CTU is a video bitstream corresponding to compressed data including the current CTU at the decoding system. The current CU is determined to be an in-bounds CU or an out-of-bounds CU in Step S1106 and the in-bounds CU is determined to be a leaf CU or to be further split in Step S1112. If the in-bounds CU is further split, it is split by a splitting type associated with a recursive splitting structure in Step S1114. The splitting type includes a 2-D splitting type. Steps S1112 and S1114 are performed recursively until the in-bound CU is divided into multiple non-overlapped leaf CUs. The out-of-bounds CU is split by a 1-D splitting type in Step S1108 and each of the resulting child CUs is checked to be an in-bounds CU or an out-of-bounds CU in Step S1106 by setting the child CU as the current CU in Step S1110. Examples of the 1-D splitting type are binary-tree horizontal symmetrical splitting and binary-tree vertical symmetrical splitting. Some other examples of the 1-D splitting type are asymmetric binary-tree splitting, symmetric triple-tree splitting, and asymmetric triple-tree splitting. An embodiment of the encoding or decoding system selects a 1-D splitting type for the out-of-bounds CU by implicitly derived according to one or more of boundary conditions, position, and spatial dimensions of the out-of-bounds CU. Another embodiment of the encoding or decoding system selects a 1-D splitting type by explicitly signaling the selected splitting type in the video bitstream. In Step S1116, the encoding or decoding system checks if all CUs in the current CTU are split into leaf CUs, sets a next CU as the current CU in Step S1118 if the result of Step S1116 is negative, and encodes or decodes the current CTU in Step S1120 if the result of Step S1116 is affirmative.

Exemplary System Block Diagram

Figure 12:
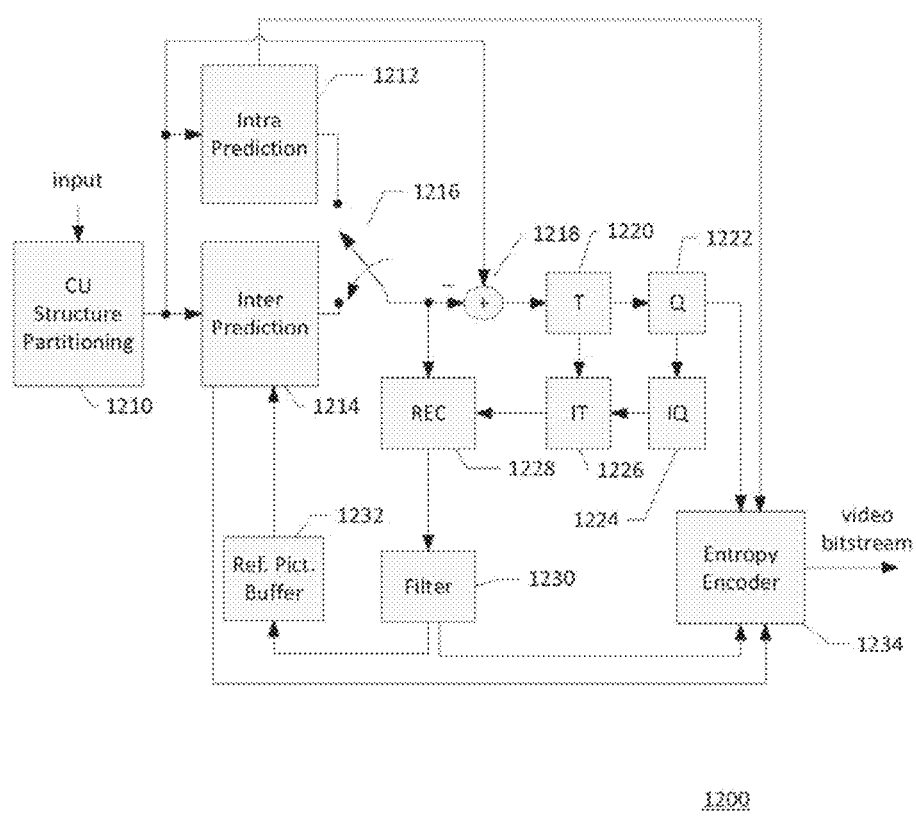
FIG. 12 illustrates an exemplary system block diagram for a video encoding system incorporating the picture processing method according to embodiments of the present invention.

FIG. 12 illustrates an exemplary system block diagram for a Video Encoder 1200 implementing various embodiments of the present invention. A CU Structure Partitioning module 1210 receives input data of video pictures and determines the block partitioning structure for each picture to be encoded. A current picture is first divided into non-overlapped blocks and each block is further divided by a recursive partitioning structure into leaf blocks in the CU Structure Partitioning module 1210, for example, multiple CTUs in a picture are divided into leaf CUs according to a QTBT splitting structure. According to embodiments of the present invention, the CU Structure Partitioning module 1210 checks whether a current block is entirely inside picture boundaries, then splits the current block by a splitting type selected from a first set of splitting types associated with the recursive partitioning structure if the current block is entirely inside the picture boundaries and is determined to be further split, or splits the current block by a splitting type selected from a second set of splitting types if the current block is not entirely inside the picture boundaries. Blocks entirely inside the picture boundaries are called in-bounds CUs and blocks across the picture boundaries are called out-of-bounds CUs. The second set of splitting types comprises at least two different splitting types. Some embodiments of the CU Structure Partitioning module 1210 implicitly select the splitting type for those out-of-bounds CUs according to their boundary conditions, positions, spatial dimensions, or a combination thereof; some other embodiments of the CU Structure Partitioning module 1210 systematically test several splitting types and select the splitting type according to the Rate Distortion Optimization (RDO) result. Information corresponds to the selected splitting type for each out-of-bounds CU may be signaled in the video bitstream for the decoders to decode the selected splitting type. Each leaf CU in the current picture is predicted by Intra prediction in Intra Prediction module 1212 or Inter prediction in Inter Prediction module 1214 to remove spatial redundancy or temporal redundancy. Intra Prediction module 1212 provides intra predictors for the current leaf CU based on reconstructed video data of the current picture. Inter Prediction module 1214 performs motion estimation (ME) and motion compensation (MC) to provide predictors for the current leaf CU based on video data from other picture or pictures. A Switch 1216 selects either Intra Prediction module 1212 or Inter Prediction module 1214 to supply the predictor to Adder 1218 to form prediction errors, also called residues. The residues of the current CU are further processed by Transform module (T) 1220 followed by Quantization module (Q) 1222. The transformed and quantized residual signal is then encoded by Entropy Encoder 1234 to form a video bitstream. The video bitstream is then packed with side information. The transformed and quantized residual signal of the current CU is processed by Inverse Quantization module (IQ) 1224 and Inverse Transform module (IT) 1226 to recover the prediction residues. As shown in FIG. 12, the residues are recovered by adding back to the selected predictor at Reconstruction module (REC) 1228 to produce reconstructed video data. The reconstructed video data may be stored in Reference Picture Buffer (Ref. Pict. Buffer) 1232 and used by Inter Prediction module 1214 for prediction of other pictures. The reconstructed video data from REC 1228 may be subject to various impairments due to the encoding processing, consequently, In-loop Processing Filter (Filter) 1230 is applied to the reconstructed video data before storing in the Reference Picture Buffer 1232 to further enhance picture quality.

Figure 13:
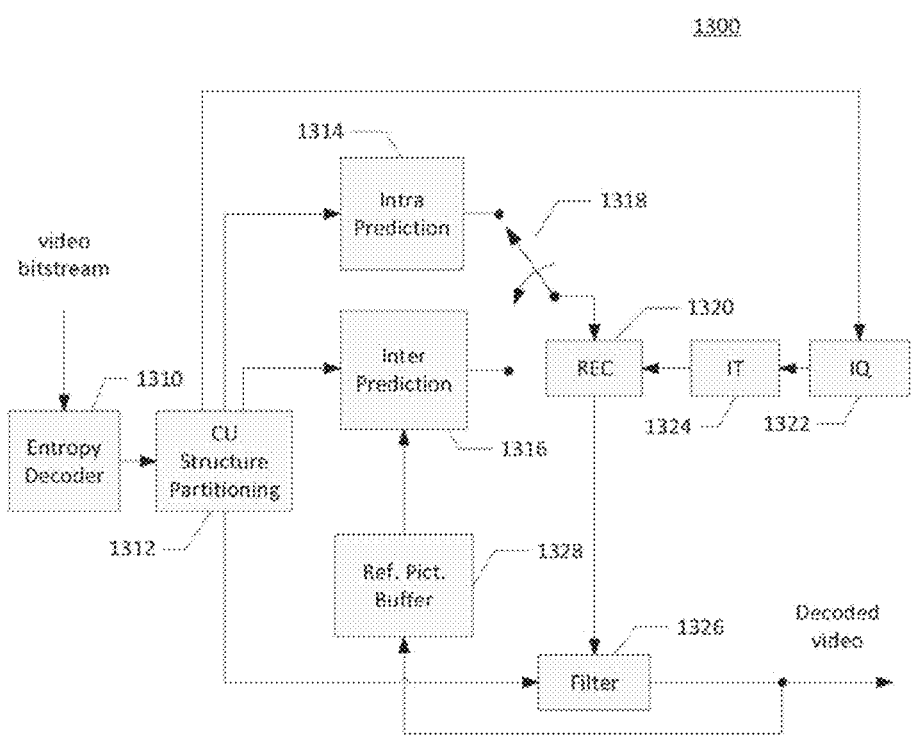
FIG. 13 illustrates an exemplary system block diagram for a video decoding system incorporating the picture processing method according to embodiments of the present invention.

A corresponding Video Decoder 1300 for decoding the video bitstream generated by the Video Encoder 1200 of FIG. 12 is shown in FIG. 13. The input to the Video Decoder 1300 is decoded by Entropy Decoder 1310 to parse and recover the transformed and quantized residual signal and other system information. A CU Structure Partitioning module 1312 determines block partitioning of each video picture according to various embodiments of the present invention. In some embodiments of the CU Structure Partitioning module 1312, an out-of-bounds CU is partitioned by a splitting type selected from a second set of splitting types consisting of at least two different splitting types, and in some other embodiments, an out-of-bounds CU is partitioned by a 1-D splitting type. The decoding process of the Decoder 1300 is similar to the reconstruction loop at the Encoder 1200, except the Decoder 1300 only requires motion compensation prediction in Inter Prediction module 1316. Each CU is decoded by either Intra Prediction module 1314 or Inter Prediction module 1316, and a switch 1318 selects an intra predictor or Inter predictor according to decoded mode information. The transformed and quantized residual signal associated with each CU is recovered by Inverse Quantization (IQ) module 1322 and Inverse Transform (IT) module 1324. The recovered residual signal is reconstructed by adding back the predictor in REC 1320 to produce reconstructed video. The reconstructed video is further processed by In-loop Processing Filter (Filter) 1326 to generate final decoded video. If the currently decoded picture is a reference picture, the reconstructed video of the currently decoded picture is also stored in Ref. Pict. Buffer 1328 for later pictures in decoding order.

Various components of the Video Encoder 1200 and Video Decoder 1300 in FIG. 12 and FIG. 13 may be implemented by hardware components, one or more processors configured to execute program instructions stored in a memory, or a combination of hardware and processor. For example, a processor executes program instructions to control receiving of input data associated with a current picture. The processor is equipped with a single or multiple processing cores. In some examples, the processor executes program instructions to perform functions in some components in the Encoder 1200 and Decoder 1300, and the memory electrically coupled with the processor is used to store the program instructions, information corresponding to the reconstructed images of CUs, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 12 and 13, the Encoder 1200 and Decoder 1300 may be implemented in the same electronic device, so various functional components of the Encoder 1200 and Decoder 1300 may be shared or reused if implemented in the same electronic device.

Embodiments of the picture processing methods with more efficient partitioning for out-of-bounds CUs may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A picture processing method in an image or video coding system, comprising:
receiving input data associated with a current Coding Tree Unit (CTU) in a current picture, wherein the current picture is partitioned into multiple non-overlapped CTU;
splitting the current CTU into one or more non-overlapped Coding Units (CUs), and determining whether each CU in the current CTU is entirely inside boundaries of the current picture, wherein a CU entirely inside the boundaries of the current picture is an in-bounds CU and a CU not entirely inside the boundaries of the current picture is an out-of-bounds CU;
if the current CTU contains at least one in-bounds CU, determining whether to further split each in-bounds CU in the current CTU, and splitting the in-bounds CU by a splitting type selected from a first set of splitting types associated with a recursive partitioning structure if the in-bound CU is further split, wherein the in-bounds CU is a leaf CU if not further split;
if the current CTU contains at least one out-of-bounds CU, recursively splitting each out-of-bounds CU in the current CTU into leaf CUs, wherein a splitting type is selected from a second set of splitting types to partition each out-of-bounds CU, and the second set of splitting types comprise at least two different splitting types; and
encoding or decoding the current CTU by individually processing each leaf CU in the current CTU for prediction and transform processing.

2. The method of claim 1, wherein information indicating whether to split each out-of-bounds CU in the current CTU is inferred without explicitly signaling.

3. The method of claim 1, wherein information indicating which splitting type is selected for splitting each out-of-bounds CU in the current CTU is inferred without explicitly signaling.

4. The method of claim 1, wherein the second set of splitting types comprises at least two one-dimensional (1-D) splitting types, the 1-D splitting types include a horizontal splitting type and a vertical splitting type, the horizontal splitting type divides a large block into smaller blocks with reduced block height and same block width and the vertical splitting type divides a large block into smaller blocks with same block height and reduced block width.

5. The method of claim 4, wherein the second set of splitting types further comprises at least one two-dimensional (2-D) splitting type that divides a large block into smaller blocks with reduced block height and reduced block width.

6. The method of claim 5, wherein one of the 1-D splitting types is selected for splitting an out-of-bounds CU if the out-of-bounds CU crosses only one boundary of the current picture, an out-of-bounds CU is split by the horizontal splitting type if the out-of-bounds CU crosses a bottom boundary of the current picture, and an out-of-bounds CU is split by the vertical splitting type if the out-of-bounds CU crosses a right boundary of the current picture.

7. The method of claim 5, wherein the 2-D splitting type is selected for splitting an out-of-bounds CU if the out-of-bounds CU crosses both bottom and right boundaries of the current picture.

8. The method of claim 5, wherein the recursive partitioning structure is QuadTree plus Binary Tree (QTBT) structure splitting the current CTU using recursive quadtree splitting followed by recursive binary-tree splitting, and the horizontal splitting type is binary-tree horizontal symmetrical splitting, the vertical splitting type is binary-tree vertical symmetrical splitting, and the 2-D splitting type is quadtree splitting.

9. The method of claim 5, wherein the recursive partitioning structure is a Multi-Type-Tree (MTT) structure splitting the current CTU using recursive quadtree splitting followed by recursive binary-tree splitting or triple-tree splitting, and both the first and second sets of splitting types include quadtree splitting, binary-tree horizontal symmetrical splitting, binary-tree vertical symmetrical splitting, horizontal center-side triple-tree splitting, and vertical center-side triple-tree splitting.

10. The method of claim 5, wherein the recursive partitioning structure is a Multi-Type-Tree (MTT) structure splitting the current CTU using recursive quadtree splitting followed by recursive binary-tree splitting or triple-tree splitting, and the second set of splitting types only includes quadtree splitting, binary-tree horizontal symmetrical splitting, and binary-tree vertical symmetrical splitting.

11. The method of claim 1, wherein the second set of splitting types comprises a 2-D splitting type and at least one 1-D splitting type, an out-of-bounds CU is inferred to be split using a 1-D splitting type when the 2-D splitting type is disabled, and an out-of-bounds CU is inferred to be split using the 2-D splitting type when the at least one 1-D splitting type is disabled.

12. The method of claim 11, wherein the at least one 1-D splitting type is disabled for splitting an out-of-bounds CU when a spatial dimension of the out-of-bounds CU is greater than a first threshold.

13. The method of claim 12, wherein the 2-D splitting type is quadtree splitting and the at least one 1-D splitting type is binary-tree splitting, the 2-D splitting type is disabled for splitting an out-of-bounds CU when a spatial dimension of the out-of-bounds CU is less than a second threshold, and the second threshold is two times the first threshold.

14. The method of claim 12, wherein the recursive partitioning structure is a QuadTree plus Binary Tree (QTBT) structure or a Multi-Type-Tree (MTT) structure, the 2-D splitting type is disabled for splitting an out-of-bounds CU when a spatial dimension of the out-of-bounds CU is less than a second threshold, wherein the first threshold is set equal to or derived from a maximum allowed binary-tree or triple-tree root node size, and the second threshold is set equal to or derived from a minimum allowed quadtree leaf node size.

15. The method of claim 11, wherein the 2-D splitting type is disabled for splitting an out-of-bounds CU when a spatial dimension of the out-of-bounds CU is less than a second threshold and the out-of-bounds CU is not located at a bottom-right corner of the current picture.

16. The method of claim 11, wherein the 2-D splitting type is disabled for splitting an out-of-bounds CU when a spatial dimension of the out-of-bounds CU is less than a second threshold or the 2-D splitting type is disabled for splitting an out-of bounds CU divided from a parent CU using the 1-D splitting type.

17. The method of claim 11, wherein a flag is signaled to indicate an out-of-bounds CU is partitioned by the 1-D splitting type or the 2-D splitting type when the out-of-bounds CU crosses only one boundary of the current picture and both the 1-D splitting type and the 2-D splitting type are enabled for splitting the out-of-bounds CU.

18. The method of claim 17, wherein a splitting direction for an out-of-bounds CU is inferred when the flag indicates the out-of-bounds CU is partitioned by the 1-D splitting type, wherein the out-of-bounds CU is split with a horizontal splitting direction if the out-of bounds CU crosses a bottom boundary of the current picture or the out-of-bounds CU is split with a vertical splitting direction if the out-of-bounds CU crosses a right boundary of the current picture.

19. The method of claim 1, wherein recursively splitting each out-of-bounds CU in the current CTU into leaf CUs comprises determining whether each child CU split from the out-of-bounds CU is an in-bounds CU or an out-of-bounds CU, and further splitting each out-of-bounds CU using a splitting type selected from the second set of splitting types until all child CUs are in-bounds CUs.

20. The method of claim 1, wherein a maximum allowed binary-tree depth for dividing in-bounds CUs split from an out-of-bounds CTU is set to be larger than a maximum allowed binary-tree depth for dividing in-bounds CUs split from an in-bounds CTU.

21. The method of claim 1, wherein a maximum allowed binary-tree depth for dividing in-bounds CUs split from an out-of-bounds CTU is set equal to a maximum allowed binary-tree depth for dividing in-bounds CUs split from an in-bounds CTU.

22. An apparatus of processing pictures in an image or video coding system, the apparatus comprising one or more electronic circuits configured for:
  receiving input data associated with a current Coding Tree Unit (CTU) in a current picture, wherein the current picture is partitioned into multiple non-overlapped CTU;
  splitting the current CTU into one or more non-overlapped Coding Units (CUs), and determining whether each CU in the current CTU is entirely inside boundaries of the current picture, wherein a CU entirely inside the boundaries of the current picture is an in-bounds CU and a CU not entirely inside the boundaries of the current picture is an out-of-bounds CU;
  if the current CTU contains at least one in-bounds CU, determining whether to further split each in-bounds CU in the current CTU, and splitting the in-bounds CU by a splitting type selected from a first set of splitting types associated with a recursive partitioning structure if the in-bound CU is further split, wherein the in-bounds CU is a leaf CU if not further split;
  if the current CTU contains at least one out-of-bounds CU, recursively splitting each out-of-bounds CU in the current CTU into leaf CUs, wherein a splitting type is selected from a second set of splitting types to partition each out-of-bounds CU, and the second set of splitting types comprise at least two different splitting types; and
  encoding or decoding the current CTU by individually processing each leaf CU in the current CTU for prediction and transform processing.

23. A non-transitory computer readable medium storing program instruction causing a processing circuit of an apparatus to perform image processing method, and the method comprising:
  receiving input data associated with a current Coding Tree Unit (CTU) in a current picture, wherein the current picture is partitioned into multiple non-overlapped CTU;
  splitting the current CTU into one or more non-overlapped Coding Units (CUs), and determining whether each CU in the current CTU is entirely inside boundaries of the current picture, wherein a CU entirely inside the boundaries of the current picture is an in-bounds CU and a CU not entirely inside the boundaries of the current picture is an out-of-bounds CU;

if the current CTU contains at least one in-bounds CU, determining whether to further split each in-bounds CU in the current CTU, and splitting the in-bounds CU by a splitting type selected from a first set of splitting types associated with a recursive partitioning structure if the in-bound CU is further split, wherein the in-bounds CU is a leaf CU if not further split;

if the current CTU contains at least one out-of-bounds CU, recursively splitting each out-of-bounds CU in the current CTU into leaf CUs, wherein a splitting type is selected from a second set of splitting types to partition each out-of-bounds CU, and the second set of splitting types comprise at least two different splitting types; and encoding or decoding the current CTU by individually processing each leaf CU in the current CTU for prediction and transform processing.

* * * * *